(12) United States Patent
Sendrovitz

(10) Patent No.: US 7,522,606 B1
(45) Date of Patent: Apr. 21, 2009

(54) PASSIVE PACKET RE-ORDERING AND PACKET LOSS DETECTION

(75) Inventor: Ran Sendrovitz, San Ramon, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 750 days.

(21) Appl. No.: 10/985,789

(22) Filed: Nov. 9, 2004

(51) Int. Cl.
- H04L 12/28 (2006.01)
- H04J 3/24 (2006.01)
- G06F 15/16 (2006.01)
- G06F 11/00 (2006.01)
- G06C 25/02 (2006.01)

(52) U.S. Cl. .............. 370/394; 370/389; 370/469; 709/231; 714/746; 714/748

(58) Field of Classification Search .............. 370/394, 370/389, 474, 469; 709/231; 714/746, 748
See application file for complete search history.

(56) References Cited

U.S. PATENT DOCUMENTS

| | | | |
|---|---|---|---|
| 5,524,001 A * | 6/1996 | Beaudry et al. | 370/394 |
| 7,187,677 B2 * | 3/2007 | Torsner et al. | 370/394 |
| 2003/0131124 A1 * | 7/2003 | Yi et al. | 709/236 |
| 2004/0085963 A1 * | 5/2004 | Ying | 370/394 |
| 2004/0100963 A1 * | 5/2004 | Guo | 370/394 |
| 2005/0025152 A1 * | 2/2005 | Georgiou et al. | 370/394 |
| 2006/0187822 A1 * | 8/2006 | Peleg | 370/229 |

* cited by examiner

Primary Examiner—Firmin Backer
Assistant Examiner—Nittaya Juntima
(74) Attorney, Agent, or Firm—Townsend and Townsend and Crew (57) ABSTRACT

A plurality of packets are received at a receiver. The plurality of packets are sent in a first ordering from a transmitter and received in a second ordering. The second ordering is different from the first ordering. The packets, when they were sent, are assigned sequence numbers based on the first ordering. As each of the plurality of packets is received in the second ordering, a packet is written to a buffer position in a buffer based on the sequence number associated with the packet. The writes to the buffer positions are out of order or in a non-sequential order as compared to a sequential ordering of buffer positions in the buffer. Packets are then read from the buffer in a sequential order. As packets are read from the buffer, they are read in the first ordering that the packets were sent in.

26 Claims, 6 Drawing Sheets

PASSIVE PACKET RE-ORDERING AND PACKET LOSS DETECTION

BACKGROUND OF THE INVENTION

The present invention generally relates to telecommunications systems and more particularly to techniques for reordering packets received in a different order than the order in which they were sent.

Packets sent in a certain ordering through a packet switched network may arrive at a destination out of order. For example, in a packet switched network, packets may be sent through different paths in the network. The time each packet takes to travel through the different paths may vary. Accordingly, packets may be sent in one order and received in another order.

In some instances, applications may be sensitive to packet order. For example, an application may require that packets sent in one order should be processed in that order. In one example, packets that are carrying a time division multiplex (TDM) payload should be processed in the order in which they were sent.

If packets are received out of order, then the applications that are sensitive to packet order may not be able to process the packets. With the inherent design of a packet switched network, which sends packets through different paths through a network, packets are often received in an order different from the order the packets were sent. Accordingly, this may be a problem for applications that require packets to be processed in the order in which they were sent.

BRIEF SUMMARY OF THE INVENTION

The present invention generally relates to reordering packets received in a different order than in the order in which they were sent.

In one embodiment, a plurality of packets are received at a receiver. The plurality of packets are sent in a first ordering from a transmitter and received in a second ordering. The second ordering is different from the first ordering. The packets, when they were sent, are assigned sequence numbers based on the first ordering.

As each of the plurality of packets is received in the second ordering, a packet is written to a buffer position in a buffer based on the sequence number associated with the packet. The writes to the buffer positions are out of order or in a non-sequential order as compared to a sequential ordering of buffer positions in the buffer. Packets are then read from the buffer in a sequential order. As packets are read from the buffer, they are read in the first ordering in which the packets were sent. Additionally, techniques for determining packet loss are provided.

In one embodiment, a method for reordering packets sent through a telecommunications network is provided. The method comprises: receiving a plurality of packets, the plurality of packets sent in a first ordering and received in a second ordering, wherein packets in the plurality of packets are assigned sequence numbers based on the first ordering; as each packet in the plurality of packets is received in the second ordering, writing a packet to a buffer location based on a sequence number associated with the packet, wherein writes of packets in the plurality of packets as the packets are received are to non-sequential buffer locations in the buffer; and reading packets from buffer locations in the buffer in a sequential order, wherein packets read from the buffer locations in the sequential order are read in the first order.

In another embodiment, a method for reordering packets is provided. The method comprises: receiving a first packet in a plurality of packets; determining a first sequence number for the packet; writing the first packet to a first buffer position in a buffer; receiving a series of packets after the first packet, each packet associated with a sequence number, the series of packets received in a first order different than a second order the series of packets were sent; determining, for each packet in the series of packets, a sequence number; writing the series of packets, in the first order the series of packets were received, to buffer positions in the buffer based on a sequence number for each packet, the series of packets written to non-sequential buffer locations as compared to the first order; and reading the first packet and the series of packets from the buffer in a buffer order that is sequential, wherein the first packet and the series of packets are read in the second order.

In yet another embodiment, a system for reordering packets is provided. The system comprises: a sender node configured to send a plurality of packets in a first order, wherein each packet in the plurality of packets is assigned a sequence number based on the first order; and a receiver node configured to receive the plurality of packets, wherein packets in the plurality of packets are received in a second order, the receiver node comprising a buffer, wherein the receiver node is configured to: for each packet in the plurality of packets, write a packet to a buffer location based on a sequence number associated with the packet, wherein writes of packets in the plurality of packets are to non-sequential buffer locations in the buffer; and read packets from buffer locations in the buffer in a sequential order, wherein packets read from the buffer locations in the sequential order are read in the first order.

A further understanding of the nature and the advantages of the inventions disclosed herein may be realized by reference of the remaining portions of the specification and the attached drawings.

DETAILED DESCRIPTION OF THE INVENTION

Figure 1:
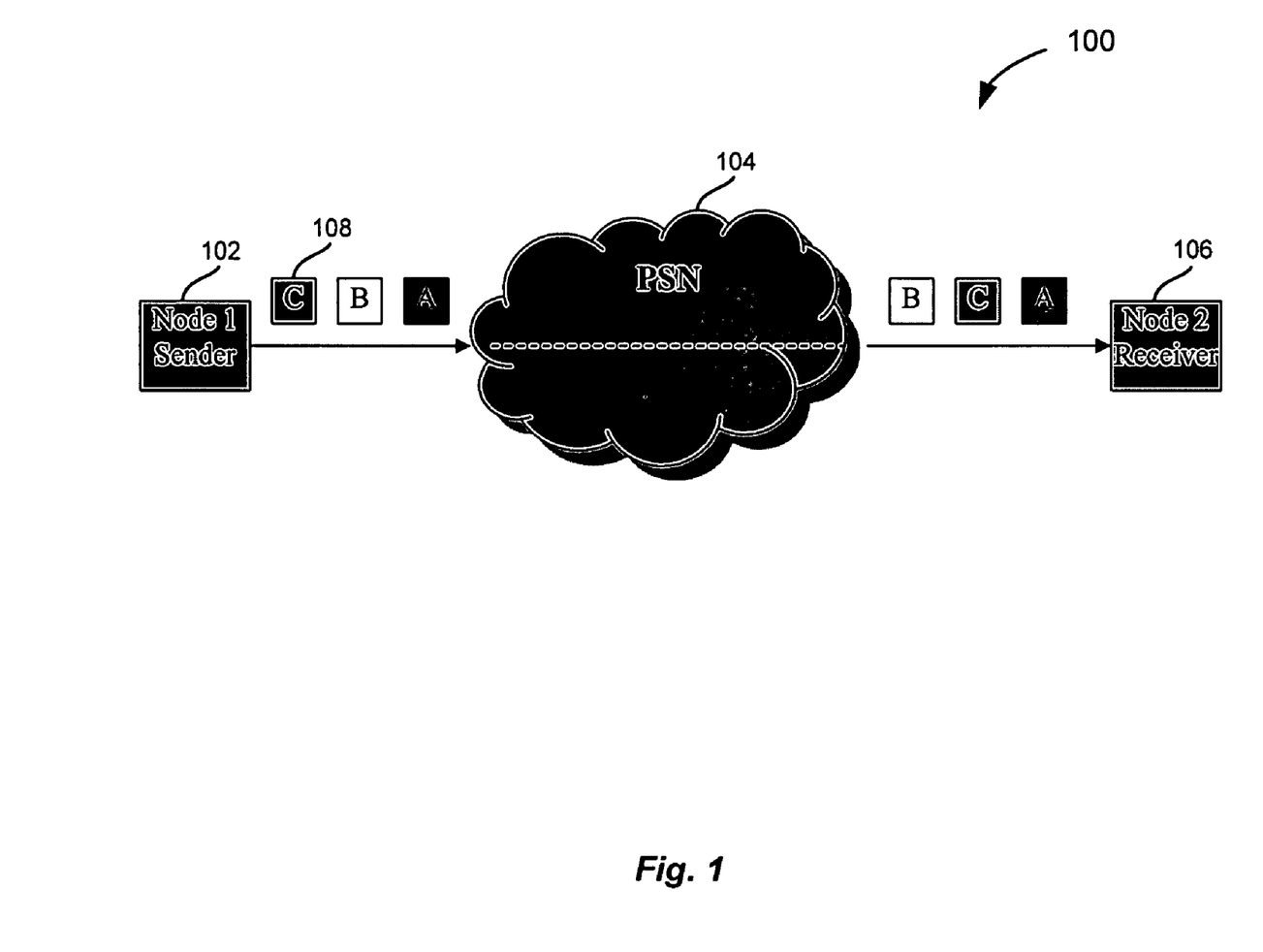
FIG. 1 depicts a system for reordering packets according to one embodiment of the present invention.

FIG. 1 depicts a system 100 for reordering packets according to one embodiment of the present invention. As shown, system 100 includes a sender node 102, a network 104, and a receiver node 106. Packets 108 are sent from sender node 102 through network 104 to receiver node 106. Although sender node 102 and receiver node 106 are shown, it will be understood that any number of sender nodes 102 and receiver nodes 106 may be included in system 100.

Packets 108 may include any data sent through network 104. In one embodiment, a file of data may be broken into chucks of data referred to as packets. The packets may be sent through network 104 in a communication between sender node 102 and receiver node 106. A communication may be any communication of a number of packets. The communication may be a streaming flow of packets. For example, the packets may include information for a streaming video, streaming audio, etc. In another embodiment, the packets may be sent in a communication for a discrete entity; for example, packets including information for a file may be sent in a communication.

Sender node 102 may be any telecommunication device configured to send packets 108. For example, sender node 102 may be a router, switcher, customer premise equipment (CPE), computing device, and the like.

Receiver node 106 may be any telecommunication device configured to receive packets 108. For example, receiver node 106 may be a computer, application, digital set top box, CPE, server, and the like.

Network 104 may be any network. For example, network 104 comprises a packet switched network. Packet switched networks are configured to send packets of data where some packets 108 in a communication may be sent through different paths. Accordingly, because packets 108 may be sent through different paths, packets 108 sent from a sender node 102 to a receiver node 106 may be received at receiver node 106 in a different order than an order in which they were sent. Also, packet reordering may occur for other reasons. Packet reordering may happen due to internal operation of equipment (like a router), for example, load-balancing inside of a router or within the network may cause packets to be received out of order.

Embodiments of the present invention enable receiver node 106 to reorder the packets that were received in a different order from an order in which they were sent. As shown, sender node 102 sends a packet 108 in a sent order of packet A, packet B, packet C. The term "sent order" refers to the order of packets sent from sender node 106 in a communication. The packets are sent through network 104 and received at receiver node 106 in a received order of packet A, packet C, packet B. The term "received order" refers to the order of packets 108 received at receiver node 106. Accordingly, the packets are received in a different order than an order in which they were sent. Receiver node 106 is then configured to reorder packets 108 from the received order to the sent order.

In one embodiment, packets 108 sent from sender node 102 are assigned sequence numbers. For example, a sequence number for a first packet sent from sender node 102 in a communication may be a random number or a predetermined number. For each subsequent packet, the sequence number may be incremented by one. Also, any other ordering scheme may be used. For example, a sequence number may be incremented by 10 for each subsequent packet. The numbering system that is used only needs to be understood by a receiver node 106 such that receiver node 106 can determine an ordering from the sequence numbers.

In one example, a first packet 108 of a communication may be assigned a sequence number of 0x1234, a second packet 108 may be assigned a sequence number of 0x1235, a third packet 108 may be assigned a sequence number of 0x1236, and so forth. A relative order in which packets 108 left sender node 102 is implied by a sequence number value assigned to each packet 108. Accordingly, as sequence numbers increase, it may be determined that packets were sent after a packet with a lower sequence number.

In one embodiment, a packet 108 includes a field, such as a sequence number field, that includes a sequence number. A sequence number field within a packet header (or trailer) may be allocated a certain number of bits. For example, 16 bits can be included in this field. Sequence numbers may be assigned sequentially for the 16-bit field. If the sequence numbers reached the maximum value that can be represented by this field, the sequence numbers may wrap around. Receiver node 106 may be configured to determine when sequence numbers wrap around and continue to process the packets 108, as will be described in more detail below.

A buffer is provided in receiver 106 that may be used to reorder packets 108 that were received in a different order in which they were sent from sender node 102. The buffer may be thought of as a reorder buffer or jitter buffer that is used to accommodate packet delay variation as introduced by network 104. Using the buffer, packets 108 may be passively reordered. Information in a packet 108 is used to write the packet 108 to a buffer location in the buffer. In one embodiment, information about the order of other packets 108 received is not used to place the packet 108 received in the buffer. This is different from conventional systems that review sequence numbers of all packets 108 received to determine an order the packets 108 were sent in.

In one embodiment, packets 108 are written to a buffer location based on a sequence number assigned to the packets 108. For example, the lower bits of a sequence number may be used to write packet 108 to a buffer location. If a sequence number is a 16-bit number, and there are 4K packet locations in the buffer, the lower 12 bits of the packet's sequence number may be used to determine a buffer location in which to store the packet 108. The lower 12 bits may be assigned to a subfield that indicates a packet location, which may be referred to as PKT_LOC_BITS (packet location bits).

Another part of the sequence number may be used to determine if a packet 108 was lost during transmission from sender node 102 to receiver node 106. For example, the upper 4 bits may be partitioned into a subfield PKT_LOSS_DET_BITS (packet & loss detection bits). This subfield may be used to determine if a packet was lost, the process of which will be described in more detail below. Although the above method of partitioning a sequence number is described, it will be understood that other methods of partitioning a sequence number to determine a buffer location may be contemplated. For example, any number of bits of the sequence number may be used to determine a buffer location in a buffer.

Figure 2:
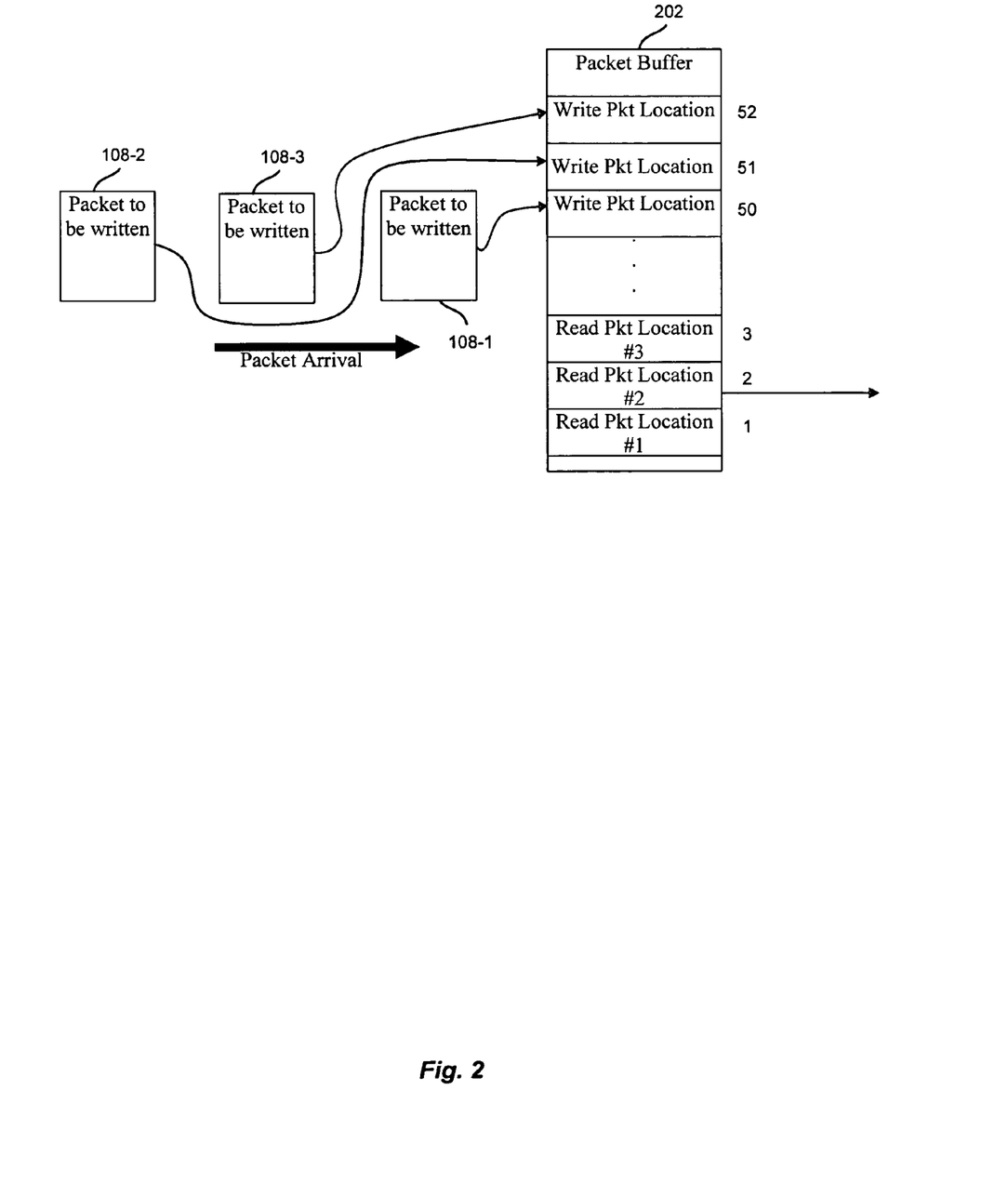
FIG. 2 depicts a buffer that is used to store packets that are received according to one embodiment of the present invention.

FIG. 2 depicts a buffer 202 that is used to store packets 108 that are received according to one embodiment of the present invention. Buffer 202 may be included in receiver 202. As shown, a packet 108-1, a packet 108-2, and a packet 108-3 are received and are written to a buffer 202.

Buffer 202 may be any device capable of storing packets. For example, packet buffer 202 may be a random access buffer or any other memory device in which packets may be written to locations in a random order.

In one embodiment, packets 108 are allocated a fixed space in buffer 202 such that it is possible to map a packet 108 with a specific sequence number to a defined buffer location within buffer 202. Accordingly, in one embodiment, the allocated buffer location size should be big enough to accommodate a maximum length packet. In another embodiment, a reference to packets 108 may be stored in the buffer. For example, pointers to where packets 108 are stored may be stored in a buffer. This may be referred to as a virtual buffer.

Buffer 202 may include a predetermined number of buffer locations. A width, N bits, of the sequence number field may be determined such that $2^{\wedge}(N)$ is at least twice the amount of buffer locations that exist in buffer 202. In one embodiment, 12 bits are used to write packets 108 to buffer 202. The 12 bits are converted into a buffer location. Accordingly, different sequence numbers convert to different buffer locations. Because the lower 12 bits of a 16 bit sequence number are used, it may be expected that multiple packets 108 may have the same lower 12 bits. If sequence numbers are incremented by 1 bit, when all 12 bits are "1", the lower 12 bits will wrap around and become zeros with the upper 4 bits being incremented by one. Accordingly, packets 108 sent with the sequence numbers after the wrap around will be assigned to the same buffer locations as the packets 108 sent in the cycle before the wrap around because they both have the same lower 12 bits. Accordingly, in one embodiment, the number of packet locations in buffer 202 should be a power of 2 of the length of the lower number of bits used to determine buffer locations. For example, 2^12 buffer locations may be assigned such that a cycle of packets 108 before wrap around may be stored in buffer 202.

Packets 202 may be written to buffer location in buffer 202. When a first packet 108 is received, it is written to a first buffer location based on its sequence number. An algorithm is used such that sequence numbers are converted to buffer locations. The algorithm is such that sequence numbers are written to sequential buffer locations.

For discussion purposes, it is assumed that a first packet 108 in the sent order is received with a sequence number of #1. This sequence number is assigned to a first position in buffer 202. This position may be an arbitrary position in buffer 202. For example, the buffer location may be any buffer location in buffer 202 depending on the algorithm used to convert sequence numbers to buffer locations such that the algorithm maps each sequence number to a different buffer location. For discussing purposes, it is assumed that sequence numbers map to the same buffer location numbers. As shown, a first packet 108 has been stored in buffer location #50 and subsequent packets #2 and #3 are stored in buffer locations #51 and #52.

For discussion purposes, packet 108-1 has been assigned a sequence number of #50, packet 108-3 has been assigned a sequence number of #52, and packet 108-2 has been assigned a sequence number of #51. It is assumed that a sent order in a communication is packet 108-1, packet 108-2, and packet 108-3. As shown, a packet 108-1 is received by receiver 106 first. A sequence number of #50 is determined and buffer location #50 is determined from the sequence number. That packet 108-1 is then written to buffer location #50.

Packet 108-3 is the next packet to arrive at receiver node 106 and has a sequence number of #52. A sequence number of #52 is determined and buffer location #52 is determined from the sequence number. That packet 108-3 is then written to buffer location #52.

Packet 108-2 arrives after both for packet 108-3 and packet 108-1 and has a sequence number of #51. A sequence number of #51 is determined and buffer location #51 is determined from the sequence number. That packet 108-2 is then written to buffer location #51.

Receiver node 106 may not use the ordering of other packets 108 received to determine where to store packet 108. Rather, the sequence number is used to determine a buffer location to store packet 108.

Accordingly, the received order is packet 108-1, packet 108-3 and packet 108-2. The packets, however, are written to buffer locations in a different sequential order from the received order. As shown, the first packet 108-1 received is written to buffer location #50, the second packet 108-3 received is written to a buffer location #52, and then the third packet 108-2 received is written to a buffer location #51 in between buffer locations #50 and #52. If these buffer locations are read out sequentially from bottom to top, then packets 108 are read out in a different order than that in which they are received. If the ordering of the buffer from bottom to top is assumed to be the sent order, packets 108 read sequentially from a buffer location that was assigned to the first packet are read in the sent order.

Thus, packets may be received in a different order than in which they were sent and written to buffer locations in buffer 202 in a non-sequential order. When packets 108 are read in a sequential order from buffer 202, they are read in the sent order. The reorder by receiver node 106 is done passively. The sequence number is analyzed to determine a buffer location to store a packet 108.

Figure 3:
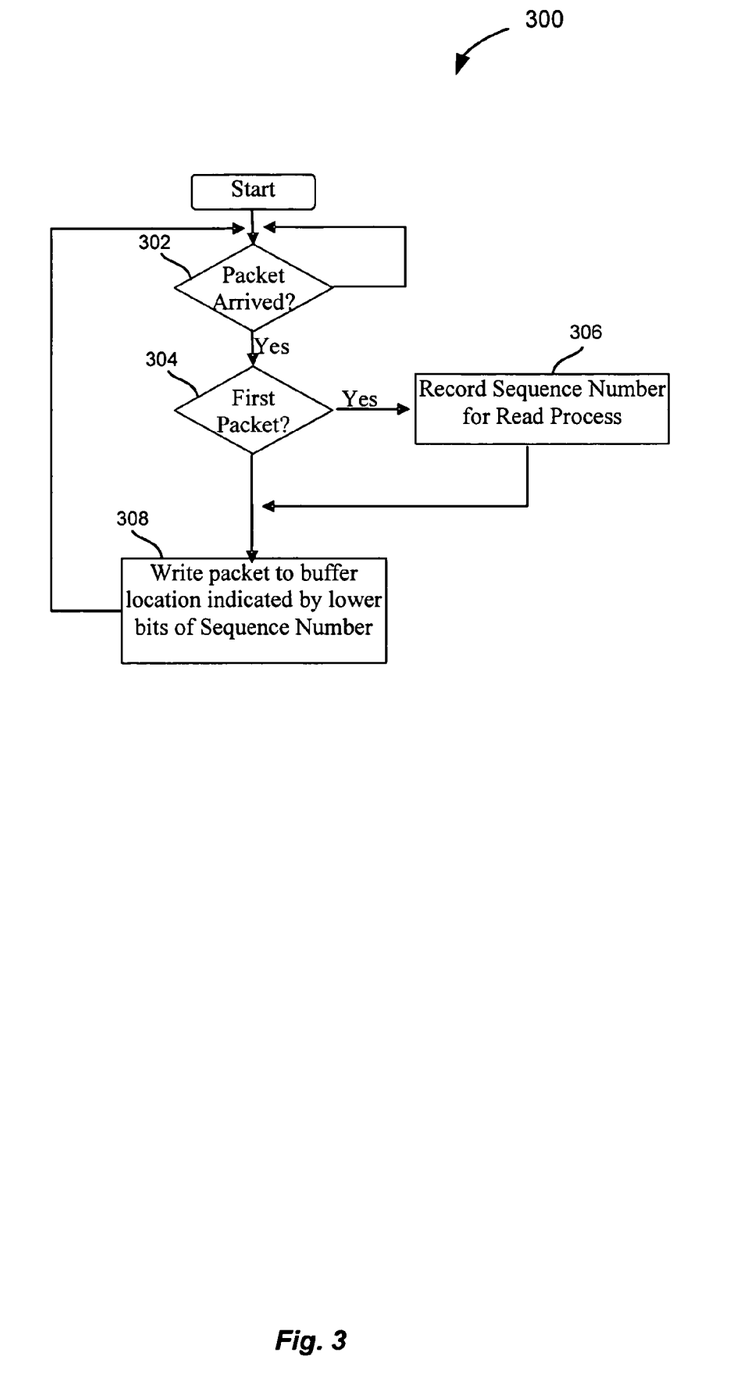
FIG. 3 depicts a simplified flowchart of a method for writing packets into a buffer according to one embodiment of the present invention.

FIG. 3 depicts a simplified flowchart 300 of a method for writing packets into buffer 202 according to one embodiment of the present invention. In step 302, receiver node 106 determines if a packet 108 has arrived. In step 304, receiver node 106 determines if the packet 108 that arrived in step 302 is a first packet in a communication. Receiver node 106 determines if the packet 108 is a first packet using information found in packet 108. For example, receiver node 106 knows a packet 108 is a first packet because it is the first packet received for a communication.

In step 306, if it is determined that packet 108 received in step 302 is the first packet 108, a sequence number associated with first packet 108 is recorded for later use in the process of reading packets from buffer 202. The process then proceeds to step 308.

In step 308, the packet 108 received in step 302 is written to a buffer location based on the sequence number associated with packet 108. For example, packet 108 may be written to a buffer location indicated by a certain number of lower bits (such as the lower 12 bits of a 16 bit number) of the sequence number.

Packets 108 may be read from buffer 202 in a sequential order. After packets 108 from a communication are written to buffer locations in buffer 202, the read process may begin after any number of packets has been written. In one embodiment, a slight buffer of packets 108 may be written into buffer 202 before a read process of reading packets 108 is started. If a streaming application is being processed, the write and read may happen continuously. However, it may not be desired that the read process start reading buffer locations before a write process has written packets 108 to those buffer locations. Thus, the read process may wait until a certain number of packets 108 are written before reading packets 108 out of buffer 202.

Figure 4:
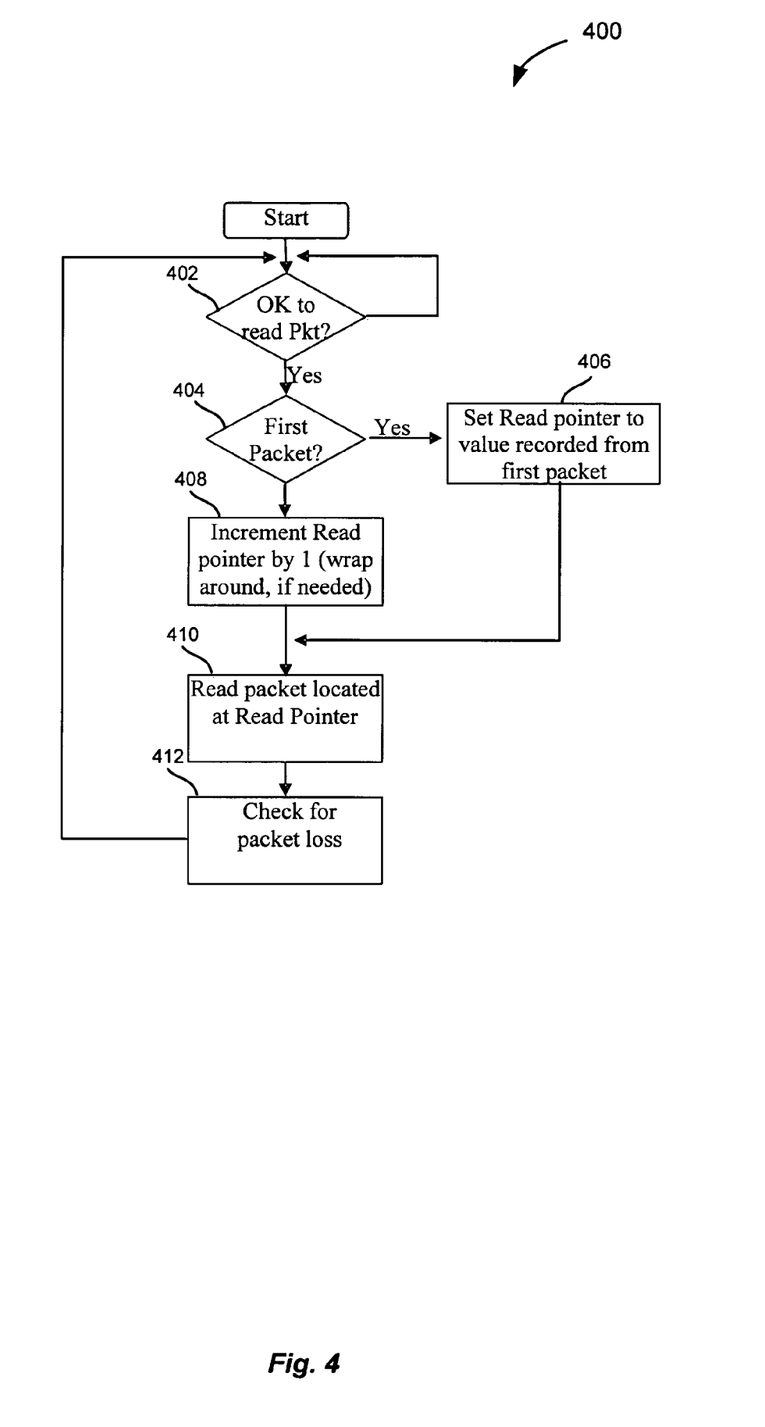
FIG. 4 depicts a simplified flowchart of a method for reading packets from the buffer according to one embodiment of the present invention.

FIG. 4 depicts a simplified flowchart 400 of a method for reading packets 108 from buffer 202 according to one embodiment of the present invention. In step 402, it is determined if a packet 108 should be read from buffer 202. The time to read the packets from buffer 202 may vary. For example, it may be determined that packets 108 can be read from buffer 202 when a certain number of sequential buffer locations had been filled with packets. In one example, after 20 packets 108 have been received, the read process may begin.

If it is not OK to read a packet in step 402, the process reiterates where it is determined if it is OK to read a packet again. Determining when it is OK to read the next packet may be based, for example, on the status of a subsequent FIFO. If the FIFO has enough room to store one full packet, then the read process may determine that it is OK to read the next packet. Other methods to determine when it is OK to read the next packet may be used.

In step 404, if it is time to read a packet from buffer 202, receiver node 106 determines if a packet 108 read from a buffer location is a first packet 108. Receiver node 106 determines the buffer location of the first packet. For example, the sequence number recorded in step 306 of FIG. 3 may be used to determine the buffer location.

In step 406, if the packet 108 read in step 402 is the first packet, a read pointer to a buffer location where the first packet 108 was written to is set. Subsequent reads may be performed sequentially from this location by incrementing the read pointer to the next sequential buffer location of buffer 202.

If the packet 108 read is not a first packet, in step 408, a read pointer is incremented by one, with wraparound if needed. The read pointer may be incremented by other increments as determined by other algorithms used in moving sequentially through buffer locations in a buffer 202. For example, if every second buffer location should be read, then read pointer would be incremented by two.

In step 410, a packet 108 that is located at a buffer location associated with the read pointer is read. Accordingly, if it is determined that the packet 108 read is a first packet 108, then in step 406, the read pointer would be set to that buffer location for the first packet 108. If it was not the first packet 108, then the read pointer was incremented by one and a packet 108 is read at the next sequential location from the packet 108 read in step 404.

In step 412, receiver node 106 determines if a packet 108 has been lost. This process will be described in FIG. 5 below. The process determines if a packet has been lost because some packets may have been lost during communication through network 104.

The process then reiterates to step 402 where it is determined if it is OK to read the next packet. The process proceeds as described above.

Because packets 108 may be assigned the same buffer locations, a packet loss detection process is provided. For example, packets 108 may be stored in buffer locations through a first cycle through buffer 202. Then, a next cycle of packets 108 after the sequence numbers wrap around would begin again and would be stored in the same buffer locations as the cycle before. If a packet 108 is lost in a communication, then that packet 108 would not be written to a buffer location. That buffer location, however, may include a packet 108 that was written in a previous cycle. It is not desirable that the read process assume that this packet 108 should be read in the stream of packets 108 (it would be out of order and include the wrong information). Accordingly, a method of detecting packet loss is provided.

Figure 5:
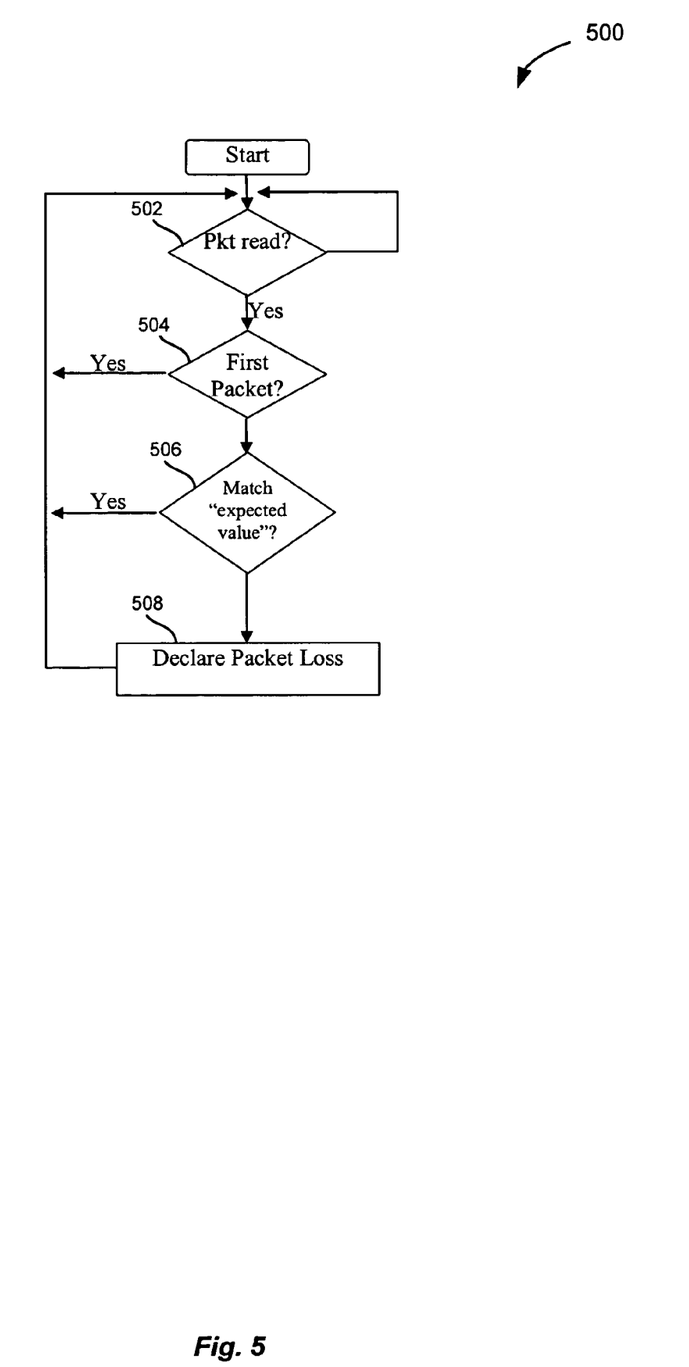
FIG. 5 depicts a simplified flowchart of a method for detecting a packet loss according to one embodiment of the present invention.

FIG. 5 depicts a simplified flowchart 500 of a method for detecting a packet loss according to one embodiment of the present invention. In step 502, it is determined if a packet 108 has been read. If a packet 108 has not been read, the process reiterates step 502 where it is determined if a packet has been read again.

In step 504, if a packet 108 is being read, it is determined if it is a first packet 108 in a sent order. If it is the first packet 108, the process reiterates the step 502, where it is determined if another packet 108 is being read. The process reiterates because if a first packet 108 is read in step 502, there cannot be packet loss yet.

However, if the packet 108 read is not a first packet 108, in step 506, it is determined if a sequence number for packet 108 matches an expected value.

In one embodiment, the sequence number is analyzed to determine if it matches an expected value. For example, the highest 4 bits of a 16 bit sequence number may be used to determine if packet loss has occurred. As described above, the sequence number may be partitioned into two subfields, PKT_LOSS_DET_BITS and PKT_LOC_BITS. The upper 4 bits of a 16 bit sequence number may be the subfield PKT_LOSS_DET_BITS. This value may be recorded when a first packet 108 of a communication is received. Packets 108 immediately following a first packet 108 of a communication should be expected to have the same PKT_LOSS_DET_BITS. This may be true if, in a 16 bit sequence number, each subsequent packet 108 has its sequence number incremented by a small amount, such as by one bit. This is because the upper 4 bits of a 16 bit number should not change until the lower 12 bits wrap around (when they are all ones). Then, the upper 4 bits will be increased by 1 bit. The expect value may be incremented by one in this case.

When reading packets 108, if the subfield PKT_LOSS_DET_BITS is different from the expected value, then a packet loss may be declared. For example, if a packet 108 has been stored in a buffer location 202 in a previous cycle through buffer 202 and has not been overwritten, then this packet 108 may not be a valid packet 108 to read. For example, as packets 108 were written to buffer 202 in a sequence, these packets 108 should have the same upper 4 bits (except when the lower 12 bits wrap around). If the upper 4 bits are different, then the packet 108 may be a packet 108 that belongs to an old cycle and a packet 108 may have been lost.

In one embodiment, receiver node 106 may detect where a number of consecutive packets 108 read out include identical PKT_LOSS_DET_BITS values that are different from the expected value. In this case, receiver node 106 may change the expected value to be the value for PKT_LOSS_DET_BITS associated with these consecutive packets 108. This may prevent receiver node 106 from continuously declaring packet loss due to a wrong expected value that was recorded.

In step 508, if it is determined that there has been packet loss, the process declares a packet loss. The system may then send a signal indicating a packet loss. For example, an application playing the information in the packets 108 may adjust the playback based on the packet loss declaration (e.g., show a blank screen, play the information from a prior packet 108, etc.) The process then reiterates to step 502 where a packet 108 is read again.

Figure 6:
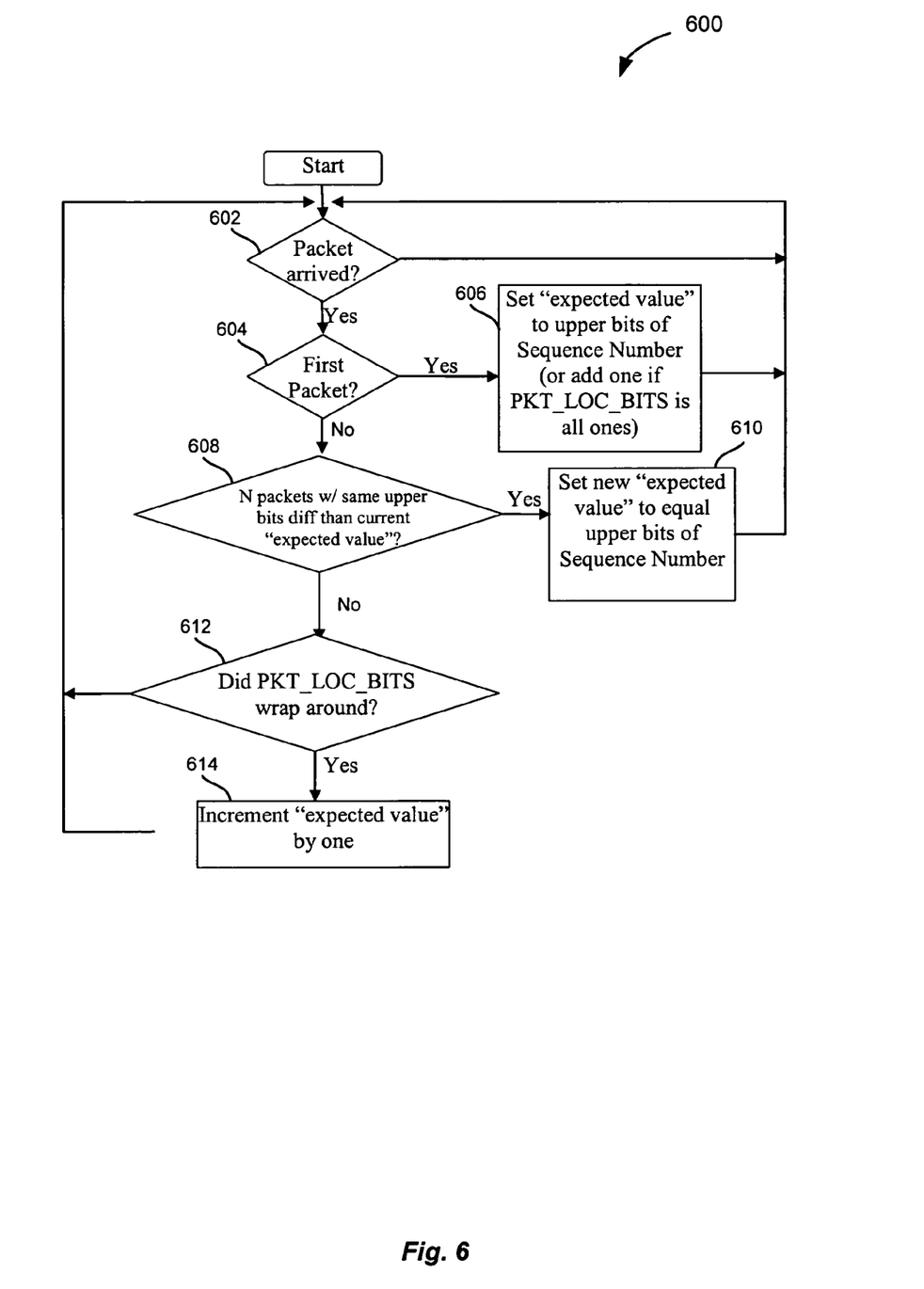
FIG. 6 depicts a simplified flowchart of a method for determining an expected value according to one embodiment of the present invention.

FIG. 6 depicts a simplified flowchart 600 of a method for determining an expected value according to one embodiment of the present invention. In step 602, it is determined if a packet 108 has arrived. If a packet 108 has not arrived, the process reiterates to step 602 until a packet 108 arrives.

In step 604, if a packet 108 has arrived, it is determined if it is a first packet 108 in a communication. If it is a first packet 108, receiver node 106 sets an expected value to the upper 4 bits of the sequence number associated with the packet 108. Also, the expected value may be incremented by one if the lower bits (the first 12 bits) are all ones. This is because the next packet 108 received has a sequence number that wraps the first 12 bits around and the upper 4 bits will be one greater than the upper 4 bits of first packet 108. The process then reiterates step 602 where it is determined if a packet 108 has arrived again. The process then continues as described above.

In step 604, if the packet 108 that has arrived is not a first packet 108, then in step 608, it is determined if N packets include the same upper bits (PKT_LOSS_DET_BITS) that are different than a current expected value. N packets may be any number of packets 108 received at receiver node 106 in the received order. This is to protect against a case in which the expected value that has been recorded is not correct. Thus, only N packets may be declared lost due to the incorrect "expected value", but subsequent packets are compared against the revised "expected value" and therefore may not be declared lost packets.

In step 610, a new expected value is set to equal the upper bits of a sequence number for the N packets if the N packets have a different PKT_LOSS_DET_BITS. The process then reiterates to step 602 and the expected value remains unchanged.

If the upper bits (PKT_LOSS_DET_BITS) are different from the current expected value, in step 612, it is determined that the lower bits (PKT_LOC_BITS) have wrapped around. If they have wrapped around, then the expected value may need to be changed. If they have not wrapped around, the process reiterates to step 602.

In step 614, if the lower bits, PKT_LOC_BITS, have wrapped around, then the expected value is incremented by one. The expected value is incremented by one because, by having the lower bits wrap around, the higher bits will be increased by one if the sequence number is increasing sequentially.

An example using embodiments of the present invention will now be described. Assuming a maximum packet length=1,500 bytes, buffer 202 may be organized as follows: Total memory capacity (storage space) is 8,388,608 bytes (2 in the power of 23). Buffer 202 holds bytes (data bus width is 8 bits), in other words, each memory address points to exactly one byte of stored information. Each packet location in buffer 202 is a fixed 2,048 bytes allocation, which is big enough to store the maximum length packet of 1,500 bytes. Each packet location is associated with 2,048 memory addresses.

There are a total of 4,096 packet locations in buffer 202, which means total memory capacity is 4,096×2,048=8,388, 608. The first packet location starts at memory address 0x000000 and ends at 0x00007FF (0x7FF hexadecimal is 2,047 decimal). The second packet location starts at memory address 0x000800 (2,048 decimal) and ends at 0x0000FFF (4,095 decimal).

In this example, the lower 11 bits of the memory address represent a "byte-location", or "offset" within a "packet location". The upper 12 bits of the memory address represent the "packet location". If a packet 108 arrives at the receiver node 106 with a sequence number field of 0x1234, the lower 12 bits (PKT_LOC_BITS) of 0x1234 are 0x234. 11 zero bits may be appended to the right to get the memory address of the packet location, or where the first byte of the packet is to be stored. In this case, 0x234 in binary is "001000110100". Adding the 11 bits (all "0") to the right yields: "00100011010000000000000". The hexadecimal representation of this is 0x11A000.

Thus, this packet 108 is written (stored) at the packet location which starts at memory address 0x11A000. This address is where the first byte of packet 108 is written. The second byte is written to address 0x11A001, the third to 0x11A002 etc. until all the packet bytes are written.

The above example illustrates how to calculate the packet location from the sequence number. In another embodiment, we may want to also write (store) the complete 16-bit Sequence Number field from packet 108 together with the packet data. In this case, the packet data bytes are written starting from address 0x11A002. In addresses 0x11A000 and 0x11A001 the Sequence Number is written from the packet 108 (including PKT_LOSS_DET_BITS subfield)—to be used later for packet loss detection.

Accordingly, embodiments of the present invention provide many advantages. For example, packets may be reordered at a receiver node very easily. A receiver node may read buffer locations sequentially. Accordingly, logic that is configured to read packets is simplified. However, writing packets to buffer locations may be random in that they may be written to buffer locations that are not sequential.

Accordingly, embodiments of the present invention passively reorder packets. Instead of using information from other packets received to determine an ordering of packets, information from a packet received is used to store the packet in a buffer. Because a passive reordering process is used, less computational power is used in reordering packets.

Accordingly, applications that are sensitive to packet order may be used with networks that may send packets that may be received in a different order than the order they were sent.

The present invention can be implemented in the form of control logic in software or hardware or a combination of both. The control logic may be stored in an information storage medium as instructions executable by an information storage processor. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for reordering packets sent through a telecommunications network, the method comprising:

receiving a plurality of packets, the plurality of packets sent in a first ordering and received in a second ordering, wherein each packet comprises a plurality of location bits and a plurality of loss detection bits distinct from the plurality of location bits, and wherein a sequence number associated with each packet is determined according to its location bits;

as each packet in the plurality of packets is received in the second ordering, writing a packet to a buffer based on the sequence number associated with the packet, wherein writes of packets in the plurality of packets as the packets are received are to non-sequential buffer locations in the buffer;

reading a first packet from the buffer and establishing an expected value for packets in the buffer based on the plurality of loss detection bits corresponding to the first packet;

reading additional packets from the buffer in a sequential order, wherein the additional packets read from the buffer in the sequential order are read in the first order; and determining, for each additional packet read from the buffer, a packet loss condition based on the loss detection bits of the additional packet and the expected value.

2. The method of claim 1, wherein the plurality of packets are received in a streaming manner.

3. The method of claim 1, further comprising:

determining a first sequence number of a first packet received in the plurality of packets; and associating the first sequence number with a first buffer location in the buffer.

4. The method of claim 3, further comprising:

determining a second sequence number of a second packet received in the plurality of packets; and associating the second sequence number with a second buffer location in the buffer.

5. The method of claim 4, further comprising:
   determining a third sequence number of a third packet received in the plurality of packets; and
   associating the third sequence number with a third buffer location in the buffer.

6. The method of claim 5, wherein the third sequence number is before the second sequence number in the first ordering, wherein the third buffer location is before the second buffer location in the buffer.

7. The method of claim 6, wherein the first buffer location is determined based on the first sequence number, the second buffer location is determined based on the second sequence number and the third buffer location is determined based on the third sequence number.

8. The method of claim 1, further comprising:
   determining a position of the first packet in the buffer; and
   sequentially reading packets after the first packet in sequential positions in the buffer.

9. The method of claim 1, wherein establishing the expected value comprises:
   determining if a packet in the plurality of packets is a first packet in a communication; and
   if the packet is the first packet, determining the expected value using at least a part of a sequence number associated with the first packet.

10. The method of claim 1, wherein writing the packet to the buffer location comprises writing a reference to the packet.

11. The method of claim 10, wherein reading packets from the buffer locations comprises reading a reference from the buffer and using the reference to retrieve the packet.

12. A method for reordering packets, the method comprising:
   receiving a first packet in a plurality of packets, each of said packets comprising a plurality of location bits and a plurality of loss detection bits distinct from the plurality of location bits;
   determining a first sequence number for the first packet based on its location bits;
   writing the first packet to a first buffer position in a buffer;
   receiving a series of packets after the first packet, each packet associated with a sequence number, the series of packets received in a first order different than a second order the series of packets were sent;
   determining, for each packet in the series of packets, a sequence number according to its location bits;
   writing the series of packets, in the first order the series of packets were received, to buffer positions in the buffer based on a sequence number for each packet, the series of packets written to non-sequential buffer locations as compared to the first order; and
   reading the first packet from the buffer and establishing an expected value for packets in the buffer based on the plurality of loss detection bits associated with the first packet;
   reading additional packets from locations in the buffer in a sequential order, wherein the additional packets read from the buffer locations in the sequential order are read in the second order; and
   determining, for each additional packet read from the buffer, a packet loss condition based on its loss detection bits and the expected value.

13. The method of claim 12, wherein the plurality of packets are received in a streaming manner.

14. The method of claim 12, wherein the plurality of packets are sent in a communication.

15. The method of claim 12, further comprising determining that a packet is the first packet in a communication.

16. The method of claim 15, further comprising recording the sequence number of the first packet in the communication.

17. A system for reordering packets, the system comprising:
   a sender node configured to send a plurality of packets in a first order, wherein each packet in the plurality of packets comprises a plurality of location bits and a plurality of loss detection bits distinct from the plurality of location bits;
   a receiver node configured to receive the plurality of packets, wherein packets in the plurality of packets are received in a second order, the receiver node comprising a buffer, wherein the receiver node is configured to:
      for each packet in the plurality of packets, write a packet to a buffer location based on a sequence number associated with the packet, wherein writes of packets in the plurality of packets are to non-sequential buffer locations in the buffer;
      read a first packet from the buffer and establish an expected value for packets in the buffer based on the plurality of loss detection bits corresponding to the first packet;
      read additional packets from buffer locations in the buffer in a sequential order, wherein the additional packets read from the buffer locations in the sequential order are read in the first order; and
      determine, for each additional packet read from the buffer, a packet loss condition based on its loss detection bits and the expected value.

18. A telecommunications device for reordering packets sent through a telecommunications network, the device comprising:
   logic configured to receive a plurality of packets, the plurality of packets sent in a first ordering and received in a second ordering, wherein each packets in the plurality of packets comprises a plurality of location bits and a plurality of loss detection bits distinct from the plurality of location bits, and wherein a sequence number associated with each packet is determined according to its location bits;
   as each packet in the plurality of packets is received in the second ordering, logic configured to write a packet to a buffer based on a sequence number associated with the packet, wherein writes of packets in the plurality of packets as the packets are received are to non-sequential buffer locations in the buffer;
   logic configured to read a first packet from the buffer and establish an expected value for packets in the buffer based on the plurality of loss detection bits corresponding to the first packet;
   logic configured to read additional packets from buffer locations in the buffer in a sequential order, wherein the additional packets read from the buffer in the sequential order are read in the first order; and
   logic configured to determine, for each additional packet read from the buffer, a packet loss condition by comparing the loss detection bits of the additional packet to the expected value.

19. The telecommunications device of claim 18, wherein the plurality of packets are received in a streaming manner.

20. The telecommunications device of claim 18, further comprising:
   logic configured to determine a first sequence number of a first packet received in the plurality of packets; and logic configured to associate the first sequence number with a first buffer location in the buffer.

21. The telecommunications device of claim 20, further comprising:
    logic configured to determine a second sequence number of a second packet received in the plurality of packets; and
    logic configured to associate the second sequence number with a second buffer location in the buffer.

22. The telecommunications device of claim 21, further comprising:
    logic configured to determine a third sequence number of a third packet received in the plurality of packets; and
    logic configured to associate the third sequence number with a third buffer location in the buffer.

23. The telecommunications device of claim 22, wherein the third sequence number is before the second sequence number in the first ordering, wherein the third buffer location is before the second buffer location in the buffer.

24. The telecommunications device of claim 23, wherein the first buffer location is determined based on the first sequence number, the second buffer location is determined based on the second sequence number and the third buffer location is determined based on the third sequence number.

25. A telecommunications device for reordering packets, the telecommunications device comprising:
    logic to receive a first packet in a plurality of packets each of said packets comprising a plurality of location bits and a plurality of loss detection bits distinct from the plurality of location bits;
    logic to determine a first sequence number for the packet based on its location bits;
    logic to write the first packet to a first buffer position in a buffer;
    logic to receive a series of packets after the first packet, each packet associated with a sequence number, the series of packets received in a first order different than a second order the series of packets were sent;
    logic to determine, for each packet in the series of packets, a sequence number according to its location bits;
    logic to write the series of packets, in the first order the series of packets were received, to a buffer based on a sequence number for each packet, the series of packets written to non-sequential buffer locations as compared to the first order; and
    logic to read the first packet from the buffer and establish an expected value for packets in the buffer based on the plurality of loss detection bits associated with the first packet;
    logic configured to read additional packets from the buffer in a sequential order, wherein the additional packets read from the buffer in the sequential order are read in the second order; and
    logic configured to determine, for each additional packet read from the buffer, a packet loss condition based on its loss detection bits and the expected value.

26. The telecommunications device of claim 25, wherein the first packet and the second packet are received in a streaming manner.

* * * * *